June 30, 1936.     H. M. FOSTER     2,045,846
LATCH
Filed May 1, 1933     2 Sheets-Sheet 1
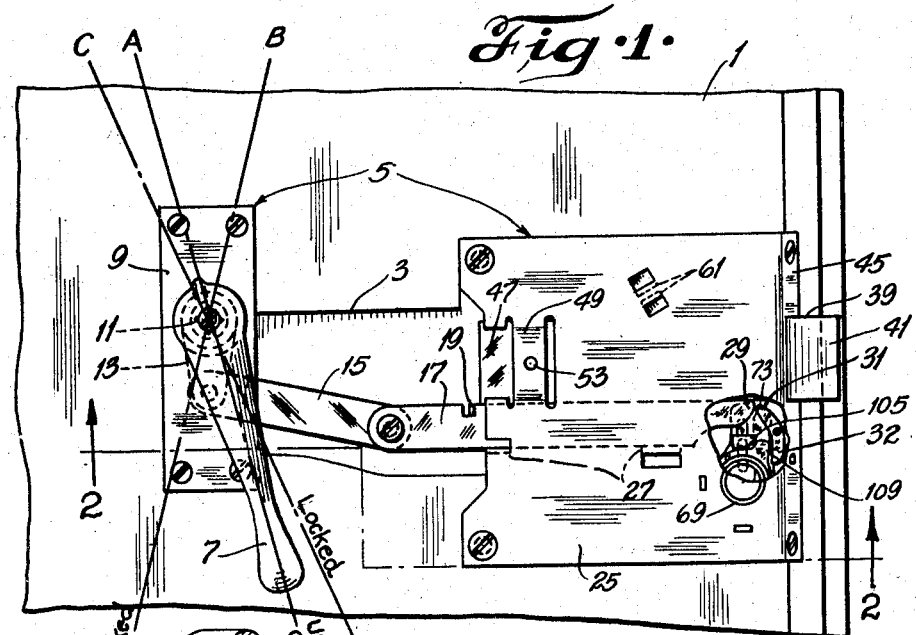
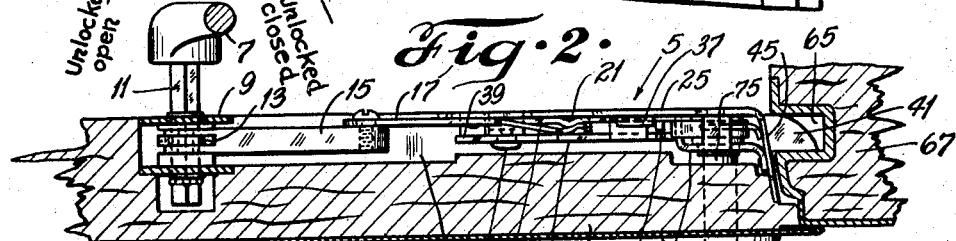
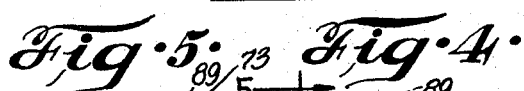
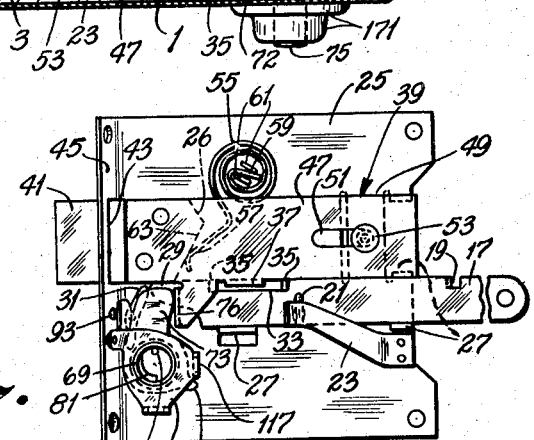
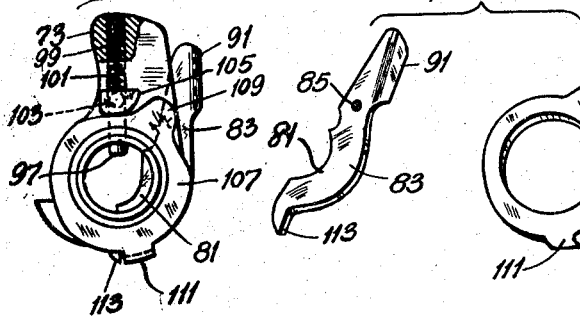
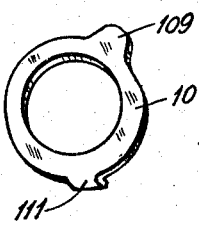
INVENTOR,
Howard M. Foster,
By Delos G. Haynes,
ATTORNEY.

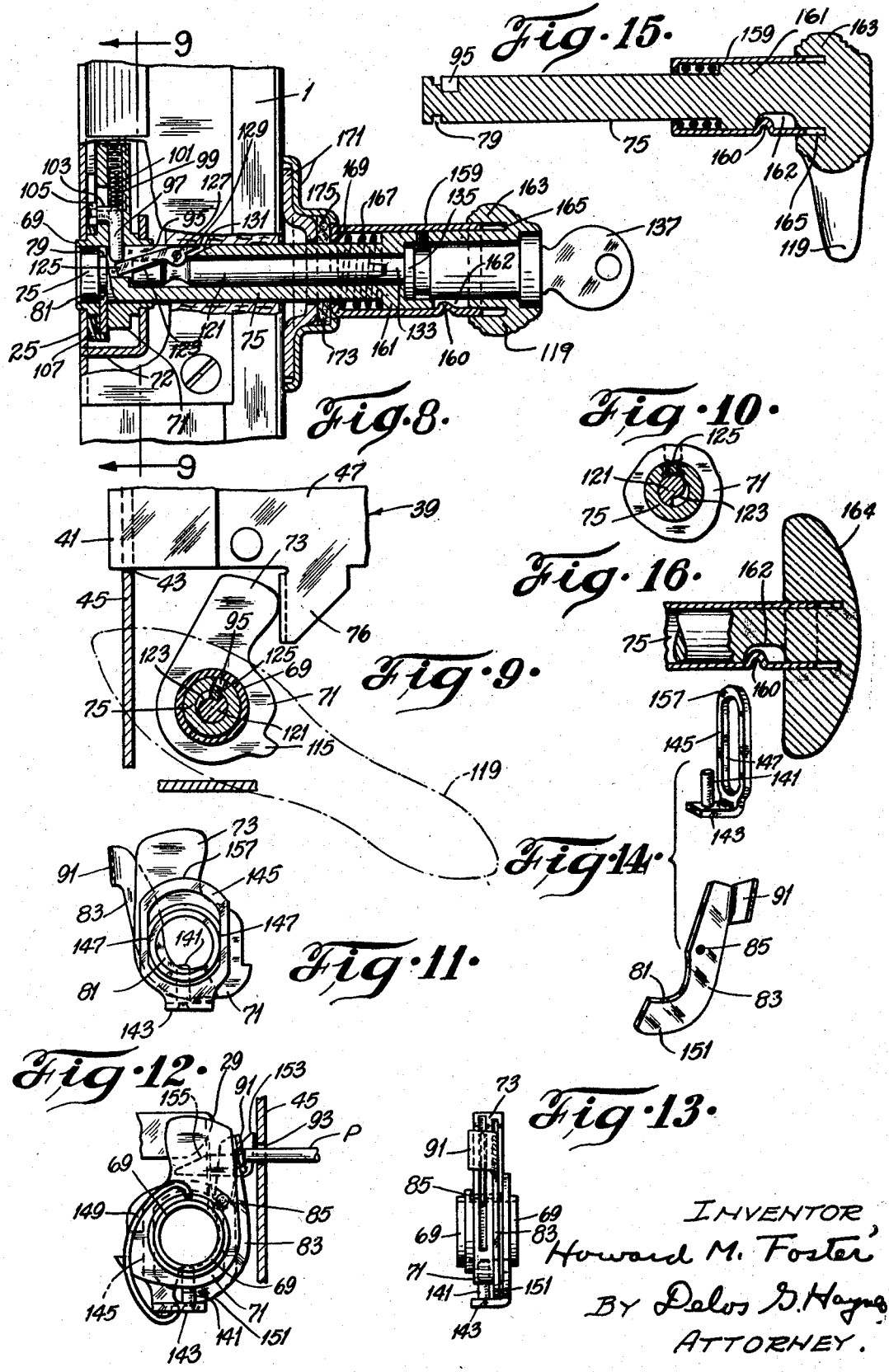

Patented June 30, 1936

2,045,846

UNITED STATES PATENT OFFICE 2,045,846

LATCH

Howard M. Foster, St. Louis, Mo., assignor to Ternstedt Manufacturing Company, Detroit, Mich., a corporation of Michigan Application May 1, 1933, Serial No. 668,676

8 Claims. (Cl. 70—91)

This invention relates to latches, and with regard to certain more specific features, to latches for automobile doors and the like, the same including locking elements.

This invention is an improvement upon the invention set forth in my patent application, Serial No. 613,307 filed May 24, 1932, for Door latch.

Among the several objects of the invention may be noted the provision of a latch for automobile doors and the like which includes a more freely rotating handle when the latch is in locked condition and which is not subject to catching or the like; the provision of a latch of the class described in which certain key handles and certain plain handles may be interchanged between a plurality of doors, said handles being of desired symmetrical or unsymmetrical design; the provision of a latch of the class described which may be locked both from the inside and from the outside but which avoids the danger of an operator locking himself out of the automobile or like compartment; the provision of apparatus of the class described which generally operates more freely and with less friction; the provision of apparatus of this class in which either plain or key-operated handles may be simply removed whenever the door is open, and whether or not the handle is in locked or unlocked condition; and provision of apparatus of this class having improved water-proofing features. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is an elevation of the latch as viewed from the interior of a door, cover parts being removed;

Fig. 2 is a cross section taken on line 2—2 of Fig. 1, viewed upwardly;

Fig. 3 is an elevation of the latch viewed from the exterior and cover parts being removed;

Fig. 4 is an enlarged detail of one form of roll back assembly;

Fig. 5 is a cross section taken on line 5—5 of Fig. 4;

Fig. 6 is an elevation taken from the rear of Fig. 4 and from the left of Fig. 5;

Fig. 7 is a view showing details of certain parts of Figs. 4 to 6 shown seriatim;

Fig. 8 is a vertical section taken through the shank of the latch, showing a keyed and unlocked position;

Fig. 9 is a cross section taken along the line 9—9 of Fig. 8, the dash line showing the position of the unsymmetrical handle of Fig. 8 ahead of the drawing plane;

Fig. 10 is a fragmentary view similar to parts of Fig. 9 but showing an alternate position of parts;

Fig. 11 is a view similar to Fig. 4 also showing a roll back but one adapted to be applied to another door so as to make possible the use of unsymmetrical handles in any location of an automobile without marring the appearance of the automobile;

Fig. 12 is another view of the roll back shown in Fig. 11, said view corresponding in elevation to Fig. 6;

Fig. 13 is an end view of the roll back shown in Figs. 11 and 12, and corresponds in form to Fig. 5;

Fig. 14 is a detailed view of parts of the roll back of Figs. 11 to 13, but corresponding in form to Fig. 7;

Fig. 15 is a longitudinal section of a plain handle which does not incorporate a lock; and, Fig. 16 is a fragmentary section showing a modified and round shape of handle.

Similar reference characters indicate corresponding parts throughout the several views of the drawings.

Referring now more particularly to Fig. 1, there is shown at numeral 1 a vehicle door formed with a rabbet 3 into which are set the latch parts designated as a whole by the numeral 5. The inside of the door faces the reader in Fig. 1.

At numeral 7 is shown an interior operating handle conveniently located with respect to passengers within the vehicle and rotatably mounted upon a bearing plate 9. The handle 7 is fastened to a shank 11 which carries interiorly of the plate 9 a crank 13 which, by means of a connecting link 15 is adapted to transmit motion to a slider 17 in a plate 25. The slider 17 has an ear 19 contacting with the plate 25 to function as a limiting stop to counterclockwise movement of the handle 7 (Fig. 1). A struck-up dog 21 (Fig. 3), slidable under a spring detent 23 serves to ensure positive positioning of the slider 17 so that the handle 7 definitely assumes position A or C and maintains either of these after the handle 7 is released by the operator thereof.

The slider extends interiorly of the plate 25 and is suitably guided therein by struck-up ears 27 and is held thereto by said spring 23. At its inner end and within the limits of plate 25, the slider 17 is provided with a nose 29 which is engageable with one end of a rocker 31, the other end of the rocker performing functions to be set forth hereinafter (Figs. 1 and 3).

The slider 17 has a rectangular notch 33 formed in the upper edge thereof at the ends of which are lugs 35, the lugs 35 being engageable with a lug 37 of a bolt 39. Inasmuch as the lug 37 is shorter than the notch 33, a lost-motion engagement is effected between the slider 17 and the bolt 39.

The bolt is also slidably mounted on the plate 25, this being accomplished by passing its latching tongue 41 through a suitable opening 43 in a flange 45 of the plate 25, and by having a strip 47 which is riveted to the tongue 41 slidably engage a flat 49 struck up from the plate 25. The strip 47 has a slot 51 surrounding the shank of, and being below the head of a guide stud 53.

The portion of the tongue 41 which is beneath the strip 47 is acted upon by one end 57 of a spiral, coil spring 55, the other end 59 of said spring being held between ears 61 struck up from the plate 25. A portion 26 of the tongue 41, located beneath the strip 47 which is engaged by the end 57 of said spring 55 is formed in a new manner, namely as a cam 63 having a sloping face which engages said end 57. By this means a smooth and constant reaction is obtained from the spring and on the working mechanism. The reason for this is that any spring normally operates according to Hooke's law, that is, the force required to compress it increases directly as the spring deflects. It will be seen that as the end 57 rotates around the virtual center of the spring, it rides farther and farther out on the cam surface 63, and thus with respect to the motion of the bolt 39 loses headway. This is caused by the sloping surface 63. In other words, the mechanical advantage of the spring, with respect to the working mechanism, becomes less and less, as the spring reactions increase. This is in addition to the loss in advantage suffered by the spring due to the radius of action increasing. Thus the action of the spring on the mechanism is more constant than it was heretofore. It will be understood that the face of the cam 63 may be preformed as desired to accomplish the said result with various bolt-operating mechanisms. This feature constitutes one of the improvements herein.

From the above it will be seen that clockwise rotation of the handle 7 from position A to position B (Fig. 1) will cause contact between the left end of the notch 33 on the slider 17 and the lug 37 on the bolt 39 (Fig. 3) thus drawing the tongue 41 into the opening 43 and out of a recess 65 in the body 67 of the automobile (Fig. 2), thus making it possible to open the door. This action takes place from the interior of the car. When the handle 7 is released, the spring 55 returns the bolt and, through the linkage 17, 15, 13, and 11, also returns the handle 7 to position A shown in Fig. 1.

The handle 7 may also be turned counterclockwise from position A to position C shown in Fig. 1, whereupon the slider 17 is driven to the right (Fig. 1) and to the left (Fig. 3), the lost motion between the notch 33 and lug 37 permitting this motion without further forcing the bolt 39 which at this time is prevented from proceeding farther by the guide stud 53. Under this action, the nose 29 of the slider 17 engages the rocker 31 to rotate it clockwise (Fig. 1) and counterclockwise, (Fig. 3). The purpose of this will be shown after the part with which the rocker engages has been described.

In order that the bolt 39 may be operated from the exterior of the automobile, I provide a roll back assembly shown in Figs. 4 to 6 having hollow gudgeons 69 formed to be borne in, and located between the plate 25 and a support 72 (Fig. 8). A primary member 71 of the roll back comprises a finger 73. Said gudgeons 69 are formed on the primary member 71. The finger 73 is engageable with a corresponding finger 76 on the bolt 39. Rotation of the roll back on its gudgeons is effected by means of a shank 75 adapted to be entered into an opening 77 through the roll back and gudgeons. The fit between the shank 75 and the opening 77 is a running fit, permitting both axial and rotary motion without excessive play. In order to hold the shank 75 in position within the opening 77 when applied, it is provided with a peripheral groove 79 engageable by an edge portion 81 of a catch 83, said catch 83 being pivoted at 85 to the primary roll back member 71. It is normally held by a spring 87 so as to hold said edge 81 in intersecting position with the groove 79 (see Figs. 4, 6 and 8).

The spring 87 reacts between a groove 89 in the roll back member 71 and a laterally located wing 91 of said catch 83. The wing 91 is normally pressed by said spring 87 toward a flange 45 of the plate 25. In said flange and opposite the wing 91 is placed an opening 93 through which a punch P or the like may be entered to push the wing 91 against the action of the spring 87 so as to rotate the catch 83 clockwise (Fig. 4) to take the edge portion 81 out of intersecting position from the groove 79 (see also Fig. 8). By reason of the position of the flange 45 on the edge of the door, it cannot be reached except when the door is open, thus preventing removal of the handle when the door is shut.

From the above it will be recognized that while the catch 81 will prevent axial movement of the shank 75, it will not prevent rotary movement thereof and, as will be seen, it is desired to have the shank 75 prevented from having rotary movement with respect to the roll back 71 to effect unlocking and to permit such movement to effect locking.

To the above end, the shank 75 is provided with a groove 95 with which engages a pin 97 reciprocally mounted in a recess 99 of the roll back 71. The pin is acted upon by a spring 101 which normally presses it toward engagement with the groove 95. It is also provided with a lateral extension 103 carrying an outside follower 105 (Figs. 6 and 8). A cam 107 having a toe 109 engageable with the follower 105 is rotatably mounted on a shoulder of the left-hand one of the gudgeons 69 (Figs. 5 and 6). Counterclockwise rotation of the cam 107 (Fig. 6) results in the toe 109 engaging the follower 105 to raise the pin 97 and thus clear the slot 95 (Fig. 8).

Rotation of the cam 107 is effected by providing a laterally extending tongue 111 thereon engageable by means of a lug 113 on said catch 83 when said catch is rotated by entry of said punch. Thus entry of the punch or like tool into the opening 93 and contact with the wing 91 not only results in clearing the edge portion 81 of the groove 79 but also in causing the cam 107 to rotate counterclockwise (Fig. 6) and thus serves to cause the finger 113 to contact the finger 111 and hence cam 107 to rotate its toe 109 into engagement with the follower 105. Thus the pin 97 is at the same time lifted from the groove 95. This is the second manner in which the present device is an improvement upon the device of my said patent application. That is to say, the shank 75 of either a plain or lock handle may be removed at any time when the door is open, whether or not the device is in locked position, because the single pressure on the wing 91 completely releases the shank 75 for axial movement by removing the catch 81 and the pin 97 from intersection therewith. The difference between plain and key-operated or lock handles will be later described.

Application of the shank is made in the inverse order of removal, that is to say, the tool P is entered into the opening 93 and the wing 91 pushed inwardly, thus clearing the opening 77 of both the pin 97 and the edge 81. The shank may then be entered and the tool being taken from the opening 93, the catch 81 will spring into the groove 79 when they are aligned axially and the pin 97 will spring into the groove 95 when they are aligned angularly. No manual alignment is necessary while holding the punch P; it is automatically accomplished by simply pressing in and/or turning the handle.

When the pin 97 is in the groove 95 (Fig. 8) and the shank 75 is turned, it will be clear that the roll back 71 is then movable with the shank and will rotate therewith. Thus the bolt 39 may be moved so as to draw the tongue 41 out of the recess 65 by rotating the shank. The spring 55, as above stated, effects return of the bolt and return rotation of the shank 75 as a consequence. Too far a return movement of the roll back 71 is prevented by a stop 115 which contacts with one of the supports 117 of said spacer plate 72 (see Fig. 3).

As above stated the handle 7 may be rotated so as to drive the slider 17 against the rocker 31 (slider to the left, Fig. 3 and right, Fig. 1). This has the action of turning said rocker 31 clockwise (Fig. 1) and engaging the opposite end 32 with the toe 109 of the cam 107, thus rotating the cam counterclockwise (Fig. 1) and forcing the follower 105 to remove the pin 97 from the slot 95.

In view of the above it will be seen that unlocking of the shank 75 to permit its rotation, but not removal, is effected by moving the handle 7 counterclockwise from position A to position C (Fig. 1).

Thus it is clear (Fig. 1) that when the handle 7 is in the position C, the tongue 41 extends to the position shown and whenever the door is closed it will so far as handle 7 is concerned become unlocked setting handle 7 to position A. This is due to the temporary forcing back of the bolt while closing the door which sets the handle to position A if it was in position C. Hence, one cannot leave the car and lock the key inside because at least one door must finally be locked from the outside which requires that the key be outside. In the position B the tongue 41 is retracted and the door is openable and, so far as the shank 75 is concerned, is in unlocked position, that is, the handle is fast to the roll back. When the handle 7 is placed in the position C, the pin 97 is withdrawn and, so far as the shank 75 is concerned, the door is locked, that is, the handle is rotatable with respect to the roll back. But a punch is required to make the handle axially free for removal and the punch also insures freedom from the pin 97.

It will be seen that it is not only desirable to effect locking of the door from the handle 7 but also from the handle 119 which is affixed to the end of the shank 75. This is accomplished by making the shank 75 hollow and providing therein a stem 121 which has an end 123 formed as a cam adapted to cooperate with an intermediate follower 125, the latter being pinned at 127 within the said slot 95 of the shank 75. The intermediate follower 125 has a tail 129 which contacts with the rear end 131 of the slot 95 and thus prevents outward movement of the member 125 and undesirable catching.

In order to turn the stem 121, it is coupled with the end 133 of a tumbler barrel 135, said barrel 135 comprising a known part of a tumbler lock. When a proper key 137 is inserted into the barrel 135, the tumblers therein, as is known, are aligned for rotation of the barrel 135. When the key 137 is withdrawn, or an improper key is placed therein, the tumblers do not properly align to permit rotation of the barrel 135. Thus it requires the proper key 137 for turning of the member 133 and stem 121.

Assuming that the proper key 137 is in place and that the stem 121 may be turned by means of said key, the operation is for the cam 123 to be turned to the position shown in Figs. 8 and 9 wherein the intermediate follower 125 is on the low portion of the cam 123, thus permitting depression of the main follower pin 97 with which said follower 125 engages. This means that the pin 97 is in the slot 95, or at least will be sent into it by spring 101 when the slot 95 is aligned therewith, thus locking the shank 75 to the roll back 71. Thus the roll back and the shank, together with handle 119 form a rotatable unit whereby the roll back may be driven against the finger 76 to move the bolt 39 back out of engagement with the socket 65 and thus the door is made openable, that is, it is unlocked.

When the key is turned in the reverse direction, the high portion of the cam 123 contacts with the intermediate follower 125 to raise the pin 97 from the slot 95, the intermediate follower 125 becoming substantially flush with the upper edge of the slot 95. Thereby the shank 75 and handle 119 are rotatable with respect to the roll back 71 and thus the door is locked, because anyone tampering with the handle 119 can accomplish nothing but to rotate the same within the bearing which supports the shank 75. The handle may not be withdrawn because at this time the catch 83 has the edge 81 within the groove 79. To open the door, the key 137 may be turned so as to permit dropping in of the pin 97 into the slot 95.

Thus it will be seen that the pin 97 may be selectably withdrawn from the slot 95 to effect locking either by the handle 7 or by the key 137, but locking by the handle 7 follows unlocking from the outside key, hence a party may enter the car with a proper key and then lock himself in by operating handle 7 to position C. Anyone attempting to enter, as a bandit, will meet with a freely rotating exterior handle. At the same time entry of a punch or like tool in the opening 95 (when the door is open) will move both the catch 81 and the pin 97 to clearing position so that the handle may be removed.

As shown in Fig. 15, there may be substituted for the handle shown in Fig. 8 another handle on which there is no lock such as lock 135. The handle described in connection with Fig. 8 will be herein known as the lock handle; whereas the handle described in Fig. 15 is a plain handle. This plain handle has the groove 79 and the slot 95, as shown, but the shank 75 is solid. All operations are the same, except that the handle cannot be locked from the outside. However, it may be locked from the inside by causing the pin 97 to be withdrawn from the slot 95, thus causing the handle to be freely rotatable, though not axially withdrawable. The reason for locking it and the key handle from the inside is to prevent bandits and the like from entering the automobile while the passengers are inside and to obtain a locking action when the car is left, this being accomplished from the inside, preferably one door only having a key lock.

It will be understood that either a lock handle or a plain handle may be applied to the bearing provided within the roll back 71. This means that the owner of an automobile who has received it with one lock handle and three or so plain handles may place the lock handle wherever he desires. Or he may have as many of either type of handle as he may desire.

The above description applies to the door or doors on one side of the car, and it will be understood that if an unsymmetrical handle such as illustrated in Figs. 8, 9 and 15 be applied to the other side of the car, it will be in the wrong position from the viewpoint of appearance. To provide against this, the door or doors on the opposite side of the car, although they have the same general latch construction, are provided with a modified form of roll back. The purpose of this modified form of roll back is to place the locking pin 97 at the bottom of the roll back bearing, rather than at the top, whereby the relative position of the shank 75 with respect to the door is thrown through 180 degrees, thereby causing the handles to have the same direction and the same position rearwardly or forwardly with respect to a median line of the automobile.

The above modification is accomplished as follows, like numerals designating like parts as heretofore (Figs. 11 to 14):

The roll back 71 has essentially the same form as above described, and likewise the catch 83. On the other hand, the pin 141 is placed on a saddle member 143 and is at the bottom of the roll back, instead of at the top. Each saddle has a yoke 145 which rides on flats 147 of one of the gudgeons 69, thereby steadying the yoke and guiding it, other steadying being accomplished by the adjacent roll back itself and the plate 25.

The saddle 143 is normally held in upward position by a spring 149 reacting from the upper side of said gudgeon 69. When a punch key or the like is entered into the opening 93 and contacted with said wing 91 of the catch 83, the catch is rotated on its center 85 and the edge portion 81 thereby withdrawn. At the same time, the lower end 151 of the catch 83 contacts with the saddle 143 to draw the pin 141 downwardly against the reaction of spring 149. When the punch P is withdrawn, the spring 149 returns the pin into position. Thus any handle of the latch that is delivered to a user may be applied to any door and even though it be of unsymmetrical design such as shown in dotted lines in Fig. 9, it will have the correct angular relationship on the automobile. For instance, if on one door it is horizontal and pointing forwardly, it may be horizontal and pointing forwardly on another door. It is to be understood that the proper form of roll back may be chosen to properly position a handle on any door on any side of the car opening in any direction.

It will be seen that in this modified form of roll back no separate cam is used, the member 83 itself forming a cam at its lower end.

It will be recognized that inasmuch as said cam 107 is not used in this form, the rocker arm 31 will not be useful for effecting locking from the slider 17. Therefore a different shape of link is used at this point (see Fig. 12). This link comprises a bell crank 153, the lower leg 155 of which is contacted by the nose 29 of the slider 17. This leg then contacts with the upper portion 157 of the yoke 145 to depress the same and thus withdraw the pin from intersection with the shank 75. Thus locking also may be effected from the handle 7 as before.

Locking from the key 137, when a key handle is used, is effected in substantially the same manner as before, the member 125 contacting with the downwardly located pin, as it did with the upwardly located pin, the only difference being that the shank 75 must be turned until the slot 95 aligns with said downward pin. This difference in the amount that the handle must be turned, accounts for the handle coming into the correct angular position, as above set forth. The feature of having handles which orient themselves properly on either side of the car regardless of where they are placed and regardless of the fact that they are formed unsymmetrically, constitutes one of the improvements herein.

But it will be understood that the unsymmetrical handles need not necessarily be used. In fact, heretofore unsymmetrical handles have been used but not in the improved manner herein and primarily to provide a great lever action due to the difficulty with which the locks and latches operate. With my improved form of spring coordination with the bolt 39 (see the cam 63), this lock operates so easily that it is possible to employ a symmetrical, or round handle 164, such as is used on house doors. It is therefore probable, if style so demands, that round design of handles will be used where easily operating latches of this class are available. I have illustrated such a handle in Fig. 16, by way of example. With such a handle one form of roll back may be used throughout on a car but with an unsymmetrical form the two types should be used, one on either side of the car.

Another feature of the invention is shown in Fig. 8. This is constituted by a sleeve 159 slidably arranged on the outer end of the shank 75 over a shoulder 161 thereon. This sleeve 159 is shingle-lapped by a portion 163 on the handle 119 and is slidable in a recess 165. A spring 167 within the sleeve 159 and on the shank 75 reacts upon an inwardly turned flange 169 to normally force the sleeve 159 outwardly from the recess 165. The sleeve 159 has a lug 160 which works in a recess 162 of the shank 75 to keep the sleeve prisoner on the shank.

On the door there are fastened members 171 providing a recess 173 for supporting a soft felt or like washer 175. Thus when the shank 75 is applied to its respective latch, the inwardly directed flange 169 of the sleeve 159 contacts said washer 175 to compress the spring 167. This feature steadies the shank 75, prevents rattling, provides a constant light frictional reaction to movement which provides a smooth action, and at the same time a water seal is effected substantially preventing entrance of moisture into the latch.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a latch for a door or the like, a bolt, operating means for the bolt, said bolt operating means being adapted to be operated from a lock handle or from a inside handle or from a plain handle, means whereby either the lock handle or the plain handle may be joined to or released from the bolt operating means to effect unlocking and locking respectively, means whereby when the lock handle is joined to the bolt operating means a lock in the lock handle may effect release of the lock handle, and means whereby said inside handle may effect release of either handle.

2. In a latch for a door or the like, a bolt, operating means for the bolt, said bolt operating means being adapted to be operated from an inside handle or from a lock handle or from a plain handle, means whereby either the lock handle or the plain handle is joined to or released from the bolt operating means to effect unlocking and locking respectively, means whereby when the lock handle is joined to the bolt operating means a lock in the lock handle may effect release of the lock handle for free rotation only, means whereby said inside handle may effect said release for free rotation of either the lock or plain handle, and means whereby a tool may be applied to the door only when the door is open to completely release either the lock or plain handle for removal at a single operation, regardless of whether the respective lock or plain handle was theretofore in unlocked or locked condition.

3. In a latch for a door or the like, a bolt, operating means for the bolt, said bolt operating means being adapted to be operated from an inside handle or from a lock handle or from a plain handle, means whereby either the lock handle or the plain handle is joined to or released from the bolt operating means to effect unlocking and locking respectively, means whereby when the lock handle is joined to the bolt aperating means a lock in the lock handle may effect release of the lock handle for free rotation only, means whereby said inside handle may effect said release for free rotation of either the lock or plain handle, and means whereby a tool may be applied to the door to compeltely release either the lock or plain handle for removal at a single operation.

4. In a latch for a door or the like, a bolt, operating means for the bolt controllable from an inside operating handle, said bolt operating means being adapted to receive a lock handle or a plain handle, means whereby either the lock handle or the plain handle may be joined to or released from the bolt operating means to effect unlocking and locking respectively, and means whereby reciprocation of the bolt upon closing of the door automatically unlocks the door with either a lock or plain handle in place therein by placing said operating handle in an unlocked position.

5. In a latch for a door or the like, a bolt, operating means for the bolt controllable from an inside operating handle, said bolt operating means being adapted to receive a lock handle or a plain handle, means for joining or releasing said lock handle with respect to the bolt operating means either by a key in the lock handle when the lock handle is joined to the bolt operating means or by said inside handle to effect unlocking and locking respectively.

6. In a latch for a door or the like, a bolt, operating means for the bolt controllable from an inside operating handle, said bolt operating means being adapted to receive a lock handle or a plain handle, means for joining or releasing either of said handles with respect to the bolt operating means, either by a key in the lock handle when the lock handle is joined to the bolt operating means or by said inside handle to effect unlocking and locking respectively, and means whereby a door with either a lock or a plain handle is automatically unlocked upon closing the door.

7. In a latch for a door or the like, a bolt, operating means for the bolt controllable from an inside operating handle, said bolt operating means being adapted to receive a lock handle or a plain handle, means for joining or releasing either of said handles with respect to the bolt operating means either by a key in the lock handle when the lock handle is joined to the bolt operating means or by said inside handle to effect unlocking and locking respectively, and means whereby a door with either a lock or a plain handle is, upon closing the door, automatically and completely unlocked.

8. In a latch for a door or the like, a bolt, operating means for the bolt, said bolt operating means being adapted to be operated from an inside handle and to receive a lock handle or a plain handle and means for joining or releasing said lock handle with respect to the bolt operating means either by a key in the lock handle when the lock handle is applied to the bolt operating means or by said inside handle to effect unlocking and locking respectively, said means for joining or releasing the lock handle to or from the bolt operating means by the inside handle being also effective to unlock and lock the plain handle when it is applied.

HOWARD M. FOSTER.